United States Patent
Tohta

(10) Patent No.: US 9,815,466 B2
(45) Date of Patent: Nov. 14, 2017

(54) LOCK-UP CLUTCH CONTROL DEVICE FOR VEHICLE

(71) Applicant: Nissan Motor Co., Ltd., Yokohama-shi, Kanagawa (JP)

(72) Inventor: Yuzuru Tohta, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/318,415

(22) PCT Filed: Sep. 3, 2014

(86) PCT No.: PCT/JP2014/073222
§ 371 (c)(1),
(2) Date: Dec. 13, 2016

(87) PCT Pub. No.: WO2016/035169
PCT Pub. Date: Mar. 10, 2016

(65) Prior Publication Data
US 2017/0120918 A1   May 4, 2017

(51) Int. Cl.
*F16H 45/02*   (2006.01)
*B60W 30/18*   (2012.01)
(Continued)

(52) U.S. Cl.
CPC .... *B60W 30/18072* (2013.01); *B60W 10/026* (2013.01); *B60W 10/06* (2013.01);
(Continued)

(58) Field of Classification Search
CPC ......... B60W 30/18072; B60W 10/026; B60W 10/06; B60W 2510/0241;
(Continued)

(56) References Cited

U.S. PATENT DOCUMENTS 6,345,223 B1 * 2/2002 Takizawa .............. B60T 8/3215
477/166
9,050,964 B2   6/2015 Tohta et al.
(Continued)

FOREIGN PATENT DOCUMENTS

JP   5-27249 U   4/1993
JP   7-310566 A   11/1995
(Continued)

*Primary Examiner* — David J Hlavka
(74) *Attorney, Agent, or Firm* — Global IP Counselors, LLP

(57) ABSTRACT

A lock-up clutch control device is provided for a vehicle, in which, when the accelerator pedal is released in a slip engagement mode, lock-up re-engagement with reduced engagement shock is performed, thereby improving fuel economy. A torque converter having a lock-up clutch is disposed between an engine and a continuously variable transmission. The vehicle is provided with a coast lock-up control unit configured to bring the engine in a fuel cut-off state when the accelerator pedal is released in a slip engagement mode in which a differential rotation is present in the lock-up clutch with the accelerator pedal being depressed. Upon accelerator fool release operation, the coast lock-up control unit performs an engine torque control to synchronize engine rotation speed and turbine rotational speed, re-engages the lock-up clutch in a rotation synchronization state, and, after the re-engagement, and performs fuel cut-off.

5 Claims, 5 Drawing Sheets

(51) Int. Cl.
*B60W 10/02* (2006.01)
*B60W 10/06* (2006.01)
(52) U.S. Cl.
CPC . *B60W 2510/0241* (2013.01); *B60W 2540/10* (2013.01); *B60W 2710/024* (2013.01); *B60W 2710/025* (2013.01); *B60W 2710/0627* (2013.01); *B60W 2710/0666* (2013.01)
(58) Field of Classification Search
CPC ... B60W 2710/0666; B60W 2710/024; B60W 2710/025; B60W 2710/0627; B60W 2540/10
See application file for complete search history.

(56) References Cited

U.S. PATENT DOCUMENTS

| 2002/0091477 | A1* | 7/2002 | Hagiwara | F16H 61/143 |
| | | | | 701/67 |
| 2010/0076667 | A1* | 3/2010 | Oshima | F02D 41/126 |
| | | | | 701/103 |

FOREIGN PATENT DOCUMENTS

| JP | 2000-310326 A | 11/2000 |
| JP | 2010-210008 A | 9/2010 |
| JP | 2011-196458 A | 10/2011 |
| JP | 2012-202540 A | 10/2012 |
| JP | 2013-204716 A | 10/2013 |
| WO | 2012/172840 A1 | 12/2012 |

* cited by examiner

LOCK-UP CLUTCH CONTROL DEVICE FOR VEHICLE

CROSS-REFERENCE TO RELATED APPLICATIONS

This application is a U.S. National stage application of International Application No. PCT/JP2014/073222, filed Sep. 3, 2014.

BACKGROUND

Field of the Invention

The present invention relates to a lock-up clutch control device for a vehicle which performs a coast lock-up control, when an engine is in a fuel cut-off state with a foot release operation.

Background Information

A technique is known in which, in response to an accelerator being on from a coast condition, in order to alleviate shock, a lock-up clutch is temporarily brought in a slip engagement state (e.g., see International Patent Publication No. WO 2012/172840 A1).

SUMMARY

However, when a fuel cut-off state occurs during slip engagement operation in response to release of a foot from an accelerator, the lock-up clutch will be rapidly engaged due to overcapacity of the lock-up clutch to cause engagement shock to occur. For this reason, in response to the accelerator foot release operation during slip engagement, in order to avoid shock, the lock-up clutch will be placed in a released state by a lock-up release instruction. However, due to the lock-up release, there is a problem that the fuel consumption is deteriorated.

The present invention has been made in view of the above problem, and aims to provide a lock-up clutch control device for improving the fuel consumption by a lock-up re-engagement with suppressed engagement shock in response to an accelerator pedal releasing or accelerator foot release in a slip engagement mode.

In order to achieve the above object, according to the present invention, a vehicle is provided with a torque converter having a lock-up clutch between an engine and a transmission. In the vehicle, a coast lock-up control unit is provided that is configured, when an accelerator foot release operation is performed in a slip engagement mode in which a rotation difference is present in the lock-up clutch with an accelerator pedal being depressed, to bring the engine in a fuel cut-off state, wherein the coast lock-up control unit is further configured to perform an engine torque control to synchronize the engine rotation speed and the turbine rotation speed in response to the accelerator foot release operation, to re-engage the lock-up clutch 3 in the rotation synchronization state, and, after the re-engagement, to perform fuel cut-off.

Thus, when the accelerator foot release operation is initiated, an engine torque control is performed to synchronize the engine speed and turbine speed, and the lock-up clutch will be engaged again in a rotation synchronization state. After the re-engagement, a fuel cut-off operation will then be implemented. In other words, prior to the fuel cut-off, the engine torque is controlled, and by a synchronization control between the engine rotation speed and the turbine rotation speed, control will shift from the accelerator foot release operation to the rotation synchronization state in a short time. Further, by re-engaging the lock-up clutch in the rotation synchronous state, the occurrence of engagement shock is suppressed. As a result, when the accelerator foot release operation is performed in the slip engagement mode, it is possible to improve the fuel consumption by the lock-up re-engagement with reduced engagement shock.

DETAILED DESCRIPTION OF THE EMBODIMENTS

Figure 1:
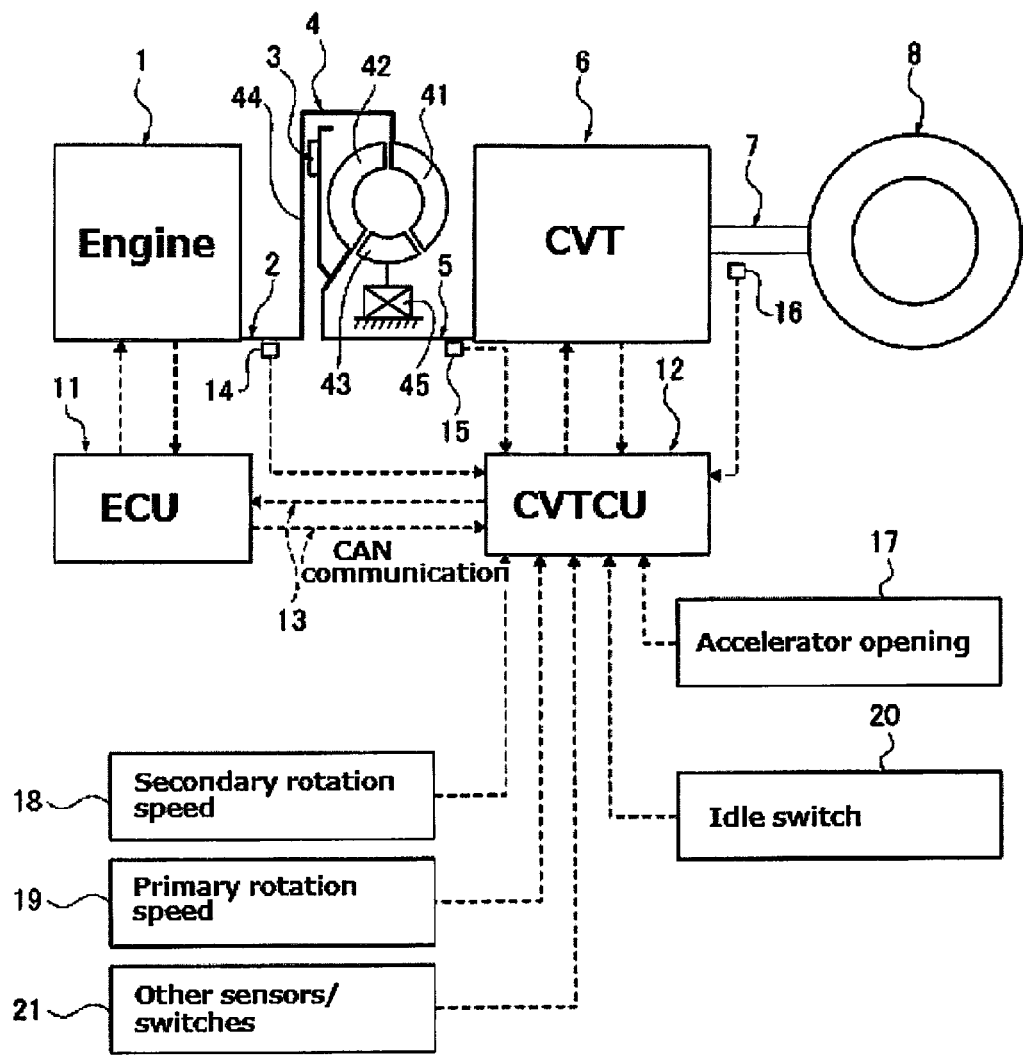
FIG. 1 is an overall system diagram showing an engine vehicle to which a lock-up clutch control device in a first embodiment is applied.

Below, a description will be given of the best mode for implementing the lock-up clutch control device for a vehicle according to the present invention with reference to a first embodiment shown in the drawings.

First, the configuration will be described. The configuration of the lock-up clutch control device for a vehicle in the first embodiment is now separately discussed in the "overall system configuration", "coast lock-up control process configuration from slip engaging state", "coast lock-up control process configuration from in a lock-up engaging state", respectively.

Overall System Configuration

FIG. 1 shows an engine vehicle in which the lock-up clutch control device of the first embodiment is applied. Below, with reference to FIG. 1, a description is made of the overall system configuration.

A vehicle drive system, as shown in FIG. 1, is provided with an engine 1, an engine output shaft 2, a lock-up clutch 3, a torque converter 4, and a transmission input shaft 5, a continuously variable transmission (CVT) 6 (transmission), a drive shaft 7, and driving wheels 8.

The lock-up clutch 3 is housed within the torque converter 4, and, in response to a clutch release, the continuously variable transmission 6 is connected through the torque converter 4 to the transmission input shaft whereas, in response to a clutch release, the engine output shaft 2 and the transmission input shaft 5 are directly connected to each other. The lock-up clutch 3 is subject to control between engagement/slip-engagement/release by an actual lock-up hydraulic pressure regulated based on a line pressure representative of source pressure, when a lock-up pressure command from the CVT control unit 12 described below is output. It should be noted that the line pressure is produced by pressure regulating a discharged oil from an oil pump not shown, that is rotationally driven by the engine 1 and/or the motor.

The torque converter 4 has a pump impeller 41, a turbine runner 42 disposed opposite to the pump impeller 41, a stator 43 arranged between the pump impeller 41 and the turbine runner 42. The torque converter 4 is a fluid coupling for transmitting torque due to circulation of the hydraulic oil filled therein in each blade of the turbine runner 42 and the stator 43. The pump impeller 41 is connected to an engine output shaft 2 through a converter cover 44 the inner surface of which serves as an engagement surface of the lock-up clutch 3. The turbine runner 42 is connected to the transmission input shaft 5. The stator 43 is provided in a stationary member (transmission case, etc.) via a one-way clutch 45.

The continuously variable transmission 6 is a belt-type continuously variable transmission for controlling the gear or speed ratio continuously by changing the belt contact diameter of a primary pulley and a secondary pulley. The output rotation after speed change is transmitted to the driving wheels 8 through the drive shaft 7.

As shown in FIG. 1, the vehicle control system includes an engine control unit 11 (ECU), a CVT control unit 12 (CVTCU), and a CAN communication line 13. As sensors for obtaining input information, an engine rotation speed sensor 14, a turbine rotation speed sensor 15 (=the CVT input speed sensor), a CVT output speed sensor 16 (=the vehicle speed sensor) are provided. In addition, an accelerator opening sensor 17, a secondary rotation speed sensor 18, a primary rotation speed sensor 19, and sensors including an idle switch 20 and other sensors/switches 21 are provided.

The engine control unit 11, in response to receiving an engine torque control signal from the CVT control unit 12 via the CAN communication line 13, controls engine torque (amount of fuel injected into the engine 1) such that a rotation speed difference (slip speed) between the engine rotation speed and the turbine rotation speed will reach "0" rpm. Then, after re-engagement of the lock-up clutch 3, when receiving a fuel cut-off request signal via the CAN communication line 13 from the CVT control unit 12, a fuel cut-off control is executed to cut-off a fuel injection amount to the engine 1.

The CVT control unit 12 executed a shift control for controlling the speed ratio of the continuously variable transmission 6, a line pressure control, and a lock-up clutch control for switching between engagement/slip-engagement/release of the lock-up clutch 3. Of the lock-up clutch controls, when, in the slip engagement mode with a rotation difference in the lock-up clutch 3 with an accelerator pedal being depressed (i.e., in the slip engagement, or, in a lock-up engagement state which has not come to complete engagement), an accelerator foot release operation is done, the coast lock-up control is executed. In the coast lock-up control, when the accelerator foot release operation is carried out, while performing the control to lower the lock-up differential pressure, an engine torque control will be performed to synchronize the engine rotation speed and the turbine rotation speed. Then, the lock-up clutch 3 will be re-engaged in the rotation synchronization state. After re-engagement, a fuel cut-off operation will be implemented.

Coast Lock-Up Control Process Configuration from Slip Engagement

Figure 2:
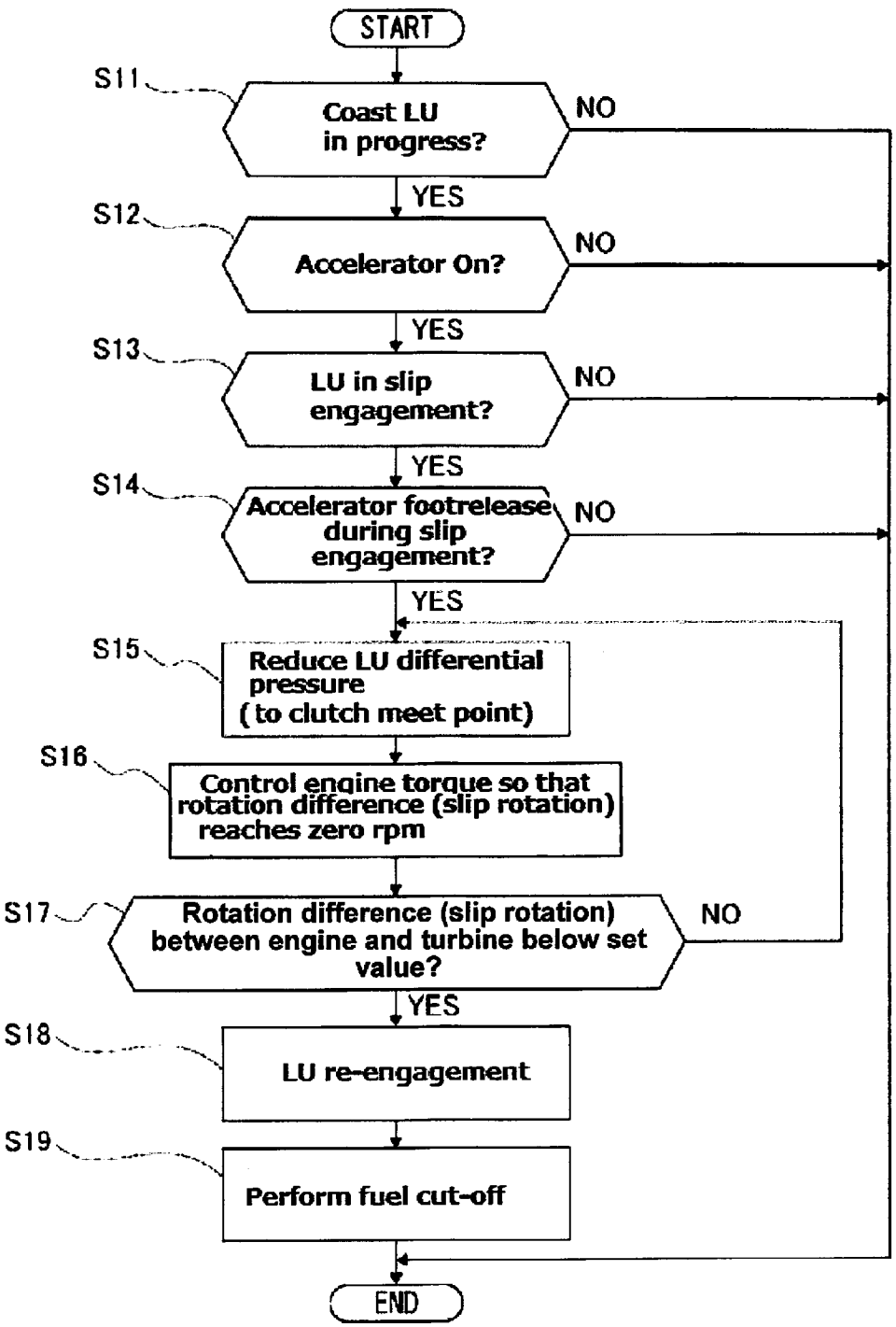
FIG. 2 is a flowchart showing a flow of coast lock-up control process from being slip engagement executed by the CVT control unit of the first embodiment. It is a flowchart showing a flow of coast lock-up control process executed by a CVT control unit in the first embodiment from lock-up state.

FIG. 2 shows a flow of coast lock-up control process from a state of being in slip engagement executed by the CVT control unit 12 of the first embodiment (coast lock-up control mechanism). Below, a description will be given of each step in FIG. 2 representing the coast lock-up control process configuration from a state of being in slip-engagement. Note that the description "LU" in FIG. 2 is an abbreviation of the lock-up.

In step S11, it is determined whether or not a coast lock-up is in progress in which the lock-up clutch 3 is engaged in the accelerator foot release state (i.e. coasting). If YES (during coast LU), control proceeds to step S12. In the case of NO (other than during coast LU), control ends.

In step S12, subsequent to the determination on the coast LU at step S11, it is determined whether or not an accelerator is being depressed. If YES (accelerator On), control proceeds to step S13. In the case of NO (accelerator Off), control proceeds to the end. Here, the accelerator depression operation (accelerator On) is determined by the accelerator opening detected by the accelerator opening sensor 17 indicating the accelerator opening exceeding "0" deg.

In step S13, subsequent to the determination of the accelerator-On in step S12, it is determined whether or not the lock-up clutch 3 is in a slip engagement. If YES (during LU slip), control proceeds to step S14. In the case of NO (other than during LU slip), control goes to the end.

In step S14, subsequent to the determination in step S13 that LU slip is in progress, it is determined whether or not an accelerator foot release operation is carried out during slip engagement of the lock-up clutch 3. If YES (foot released during slip engagement), control proceeds to step S15. In the case of NO, (no foot release during slip engagement), control returns to end.

In step S15, subsequent to the determination of foot release during slip-engagement in step S14, or, subsequent to the determination in step S17 that the slip rotation speed>set value, a control is executed on the lock-up clutch to reduce the lock-up differential pressure in the engaging direction, and control proceeds to step S16. Here, in the control of reducing the lock-up differential pressure, the lock-up differential pressure will be reduced to a lower limit region representing a clutch meet point where the lock-up clutch 3 generates a clutch capacity (in the vicinity of 0 MPa).

In step S16, following the LU differential pressure reducing process in step S15, an engine torque control is executed such that a rotation difference (slip rotation speed) between the engine rotation speed and the turbine rotation speed reaches "0" rpm, and control proceeds to step S17. Here, in the engine torque control, for example, a target slip rotation speed is set to "0", and a feedback control is implemented such that an actual slip rotation speed matches the target slip rotation speed. Alternatively, for example, by giving the target engine torque in a small constant value, the engine torque-down control is executed such that the actual engine torque matches the target engine torque.

In step S17, following the implementation of the engine torque control in step S16, it is determined whether or not the rotation difference (slip rotation speed) between the engine rotation speed and the turbine rotation speed is equal to or less than the set value. If YES (the slip rotation speed≤set value), control proceeds to step S18. In the case of NO (slip rotation speed>set value), control returns to step S15. Here, the set value is determined such that the occupant would not feel the engagement shock even when the lock-up clutch 3 is to be engaged suddenly.

In step S18, subsequent to the determination that slip rotation speed≤set value in step S17, re-engagement control of the lock-up clutch 3 is implemented, and control proceeds to step S19. Here, in the re-engagement control of the lock-up clutch 3, the rising gradient of the lock-up differential pressure is set to be larger than a lamp gradient at the time of normal engagement when engaging the lock-up clutch in a released state.

In step S19, following the LU re-engagement in step S18, a fuel cut-off to stop the fuel injection into the engine 1 will be performed, and control goes to the end.

Coast Lock-Up Control Process Configuration from Lock-Up Engaging State

Figure 3:
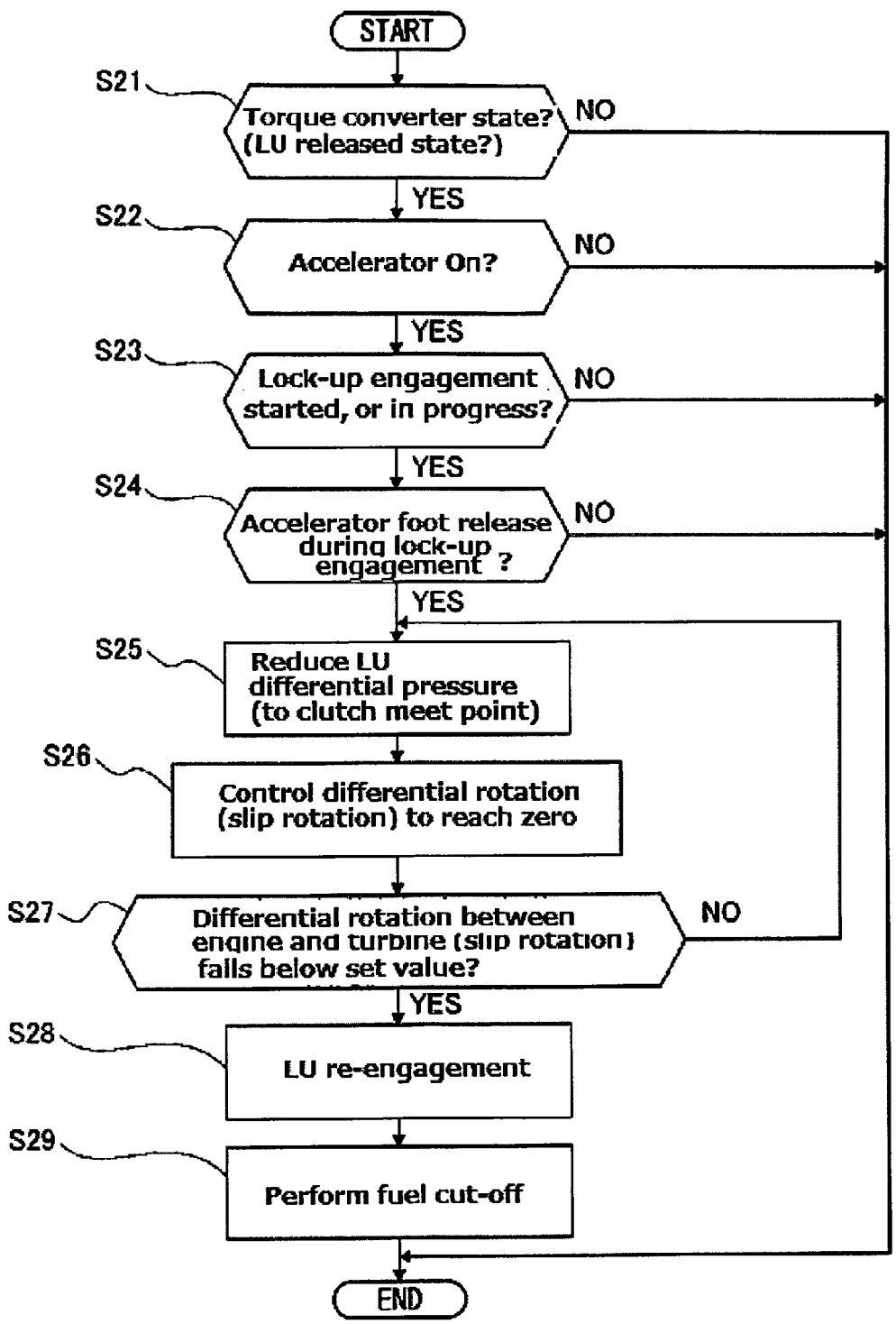
FIG. 3 is a flowchart showing a flow of coast lock-up process executed by a CVT control unit in the first embodiment from a lock-up engaging state.

FIG. 3 shows a flow of coast lock-up control process from lock-up engaging state executed by the CVT control unit 12 of the first embodiment (coast lock-up control mechanism). Below, a description will be given of each step in FIG. 3 representing the coast lock-up control process arrangement from lock-up engaging state. Note that, since each of steps S25 to S29 in FIG. 3 corresponds to each of step S15 to S19 in FIG. 2, the description thereof is omitted.

In step S21, it is determined whether or not a torque converter state is in progress in which the lock-up clutch 3 is being released due to lock-up release. If YES (torque converter state), control proceeds to step S22. In the case of NO (other than the torque converter state), control goes to the end.

In step S22, subsequent to the determination of the torque converter state in step S21, it is determined whether or not an accelerator depression operation is in place. If YES (accelerator On), control proceeds to step S23. In the case NO (accelerator-Off), control goes to the end.

In step S23, subsequent to the determination of the accelerator being On in step S22, it is determined whether or not the lock-up clutch 3 has started a lock-up engagement, or the lock-up engagement is in progress. If YES (during LU engagement), control proceeds to step S24. In the case of NO (in other than LU engagement), control goes to the end. Here, "during LU engagement refers to a state in which the lock-up clutch 3 is being under control of engagement, yet the complete clutch engagement is not yet reached so that a rotation difference is present across the clutch.

In step S24, subsequent to the determination in S23 that the LU engagement is in progress, it is determined whether or not an accelerator pedal releasing operation or accelerator foot release operation has been carried out during the lock-up engagement process of the lock-up clutch 3. If YES (foot released during LU engagement), control proceeds to step S25. In the case of NO (no release during LU engagement), control returns to the end.

Now, a description will be given of the operation. The operations in the lock-up clutch control device in the first embodiment is described separately in the "coast lock-up control operation from slip engagement operation", "coast lock-up control operation from lock-up engaging operation", and "feature operation of the coast lock-up control," respectively.

Coast Lock-Up Control Operation from Slip Engagement Operation

First, a description is given of a coast lock-up control process operation from slip engagement operation with reference to a flowchart in FIG. 2.

It is assumed that the lock-up clutch 3 enters a slip engagement state, by carrying out an accelerator depression operation in the coast lock-up that in a coast state in which the lock-up clutch 3 is engaged with accelerator pedal releasing a foot from the accelerator pedal during the slip engagement of the lock-up clutch 3, in the flowchart of FIG. 2, control proceeds from step S11 to step S17 through steps S13, S14, S15, and S16. While it is determined that the slip rotation speed>set value in step S17, the flow advancing from step S15 to step S17 via step S16 is repeated. In step S15, control is performed to decrease the lock-up differential pressure which is being imparted to the lock-up clutch 3 in engaging direction. In the next step S16, an engine torque control is performed so that the rotation difference (slip rotation speed) between the engine rotation speed and the turbine rotation speed will be "0" rpm. Subsequently, in step S17 when it is determined that the rotation synchronization state is attained in which slip rotation speed≤set value is established, control proceeds from step S17 to the end via steps S18, S19. In step S18, the lock-up clutch 3 is controlled to be re-engaged by increasing the lock-up differential pressure. In the next step S19, a fuel cut-off operation to stop fuel injection of the engine 1 is performed.

Figure 4:
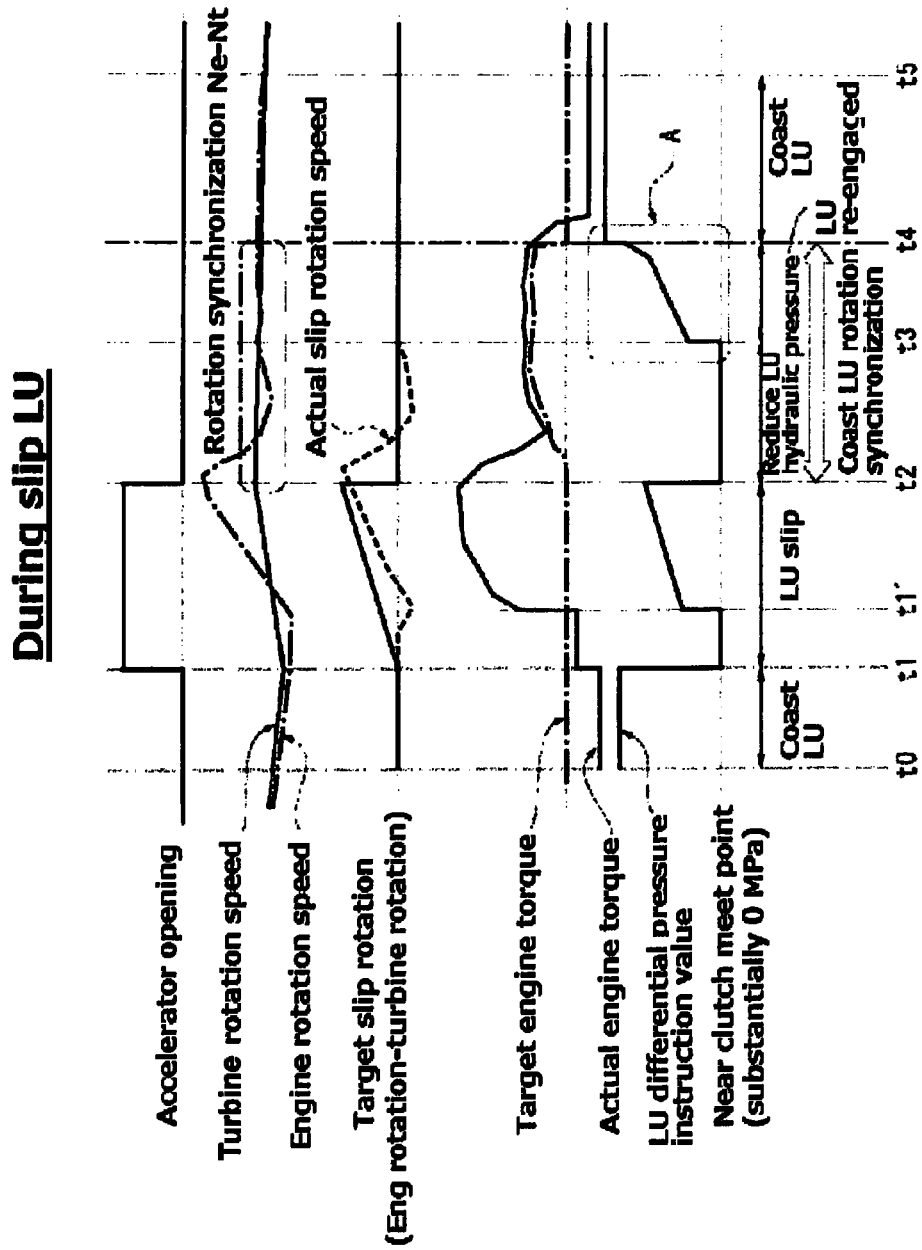
FIG. 4 is a time chart showing respective characteristics of an accelerator opening, an engine speed, a turbine rotation speed, a target slip rotation speed, an actual slip rotation speed, a target engine torque, an actual engine torque lock, and an lock-up command when the coast lock-up control is performed during the slip-engagement in the first embodiment.

Now, a description is made of a coast lock-up control operation from the slip engagement state with reference to a time chart of FIG. 4. In FIG. 4, time t1 indicates an accelerator depression operation time, the time t2 accelerator foot release operation time, the time t3 indicates a clutch re-engagement initiation time, time t4 indicates a clutch re-engagement completion time, and time t5 indicates a coast LU time, respectively. Further, a period between time t0 and time t1 indicates a coast LU interval, a period between time t1 and time t2 indicates a LU slip interval, a period between time t2 and time t3 indicates a LU hydraulic pressure reducing interval, a period between time t3 and time t4 indicates a LU re-engagement interval, and a period between time 4 and time t5 indicates a coast LU interval, respectively.

In other words, after the coast LU interval extending between time t0 and time t1 due to releasing foot from the accelerator pedal has elapsed, and upon an accelerator depression operation is started at time t1, in the LU slip interval from time t1 to t2, a slip engagement control is performed to obtain a target slip rotation speed. During the slip engagement control, for a little while from time t1 to time t1, the LU differential pressure instruction value and the engine torque will be maintained to zero. Then, after passing the time t1, the LU differential pressure instruction value will be increased by a lamp gradient to enhance the actual engine torque. Thus, the actual slip rotation speed of the lock-up clutch 3 is controlled to converge to a target slip rotation speed toward time t2.

When an accelerator foot release operation is carried out at time t2 where there is a rotation difference between the engine rotation speed and the turbine rotation speed during the LU slip state, instead of performing the fuel cut-off and release of the lock-up clutch 3, the lock-up clutch 3 is re-engaged and the fuel cut-off operation is performed. In other words, during the LU hydraulic pressure reducing period in the time period between t2 and t3, a combination of the engine torque control and the LU hydraulic pressure reducing control is performed to allow the actual slop rotation difference of the lock-up clutch 3 to converge toward "0" rpm. By the engine torque control, the actual engine torque may be adjusted in order for the actual slip rotation speed to match the target slip rotation speed (=0 rom). By the LU hydraulic pressure reducing control, during the interval between time t2 and time t3, the LU differential pressure instruction value will be fixed in the vicinity of the clutch meet point.

When a determination is made of the rotation synchronization state at a time t3 in which the slip rotation speed falls to or below the set value, the lock-up clutch 3 is re-engaged during a LU re-engagement interval extending between time t3 and time t4. In the clutch re-engagement control, as shown in the LU differential pressure instruction value characteristic in a frame A in FIG. 4, the lock-up clutch 3 will be re-engaged quickly at a ramp gradient steeper than normal. Note that the period from time t2 to time t4 represents the coast LU rotation synchronization control interval. Further, upon completion of the re-engagement of the lock-up clutch 3 at time t4, a fuel cut-off control is initiated with the target engine torque being set to zero, and the system enters a coast LU travel accompanied by the fuel cut-off operation.

Coast Lock-Up Control Operation from Lock-Up Engaging Operation

First, a coast lock-up control process operation from lock-up engaging operation is described with reference to the flowchart shown in FIG. 3.

It is now assumed that, by carrying out the accelerator depression operation during a coast LU release where the lock-up clutch 3 is released in a coast state with the foot released from an accelerator, the lock-up clutch 3 stars LU engagement, or advances in the intermediate stage of LU engagement. When carrying out the accelerator foot release operation during the lock-up engagement of the lock-up clutch 3, in the flowchart of FIG. 3, control proceeds from step S21 to step S27 via steps S22, S23, S24, S25, and S26. While it is determined that the slip rotation speed>set value in step S27, the flow from step S25 to step S27 via step S26 is repeated. In step S25, control is performed to reduce the lock-up differential pressure of the lock-up clutch 3 which is provided in the engaging direction. In the next step S26, an engine control is performed so that the speed difference (slip rotation speed) between the engine rotation speed and the turbine rotation speed will reach "0" rpm. Subsequently, when it is determined that the rotation synchronization state indicating that slip rotation speed≤set value in step S27, control proceeds from step S27 to the end through steps S28 and S29. In step S28, the re-engagement control of the lock-up clutch 3 is performed by increasing the lock-up differential pressure. In the next step S29, fuel cut-off to stop the fuel injection of the engine 1 is performed.

Figure 5:
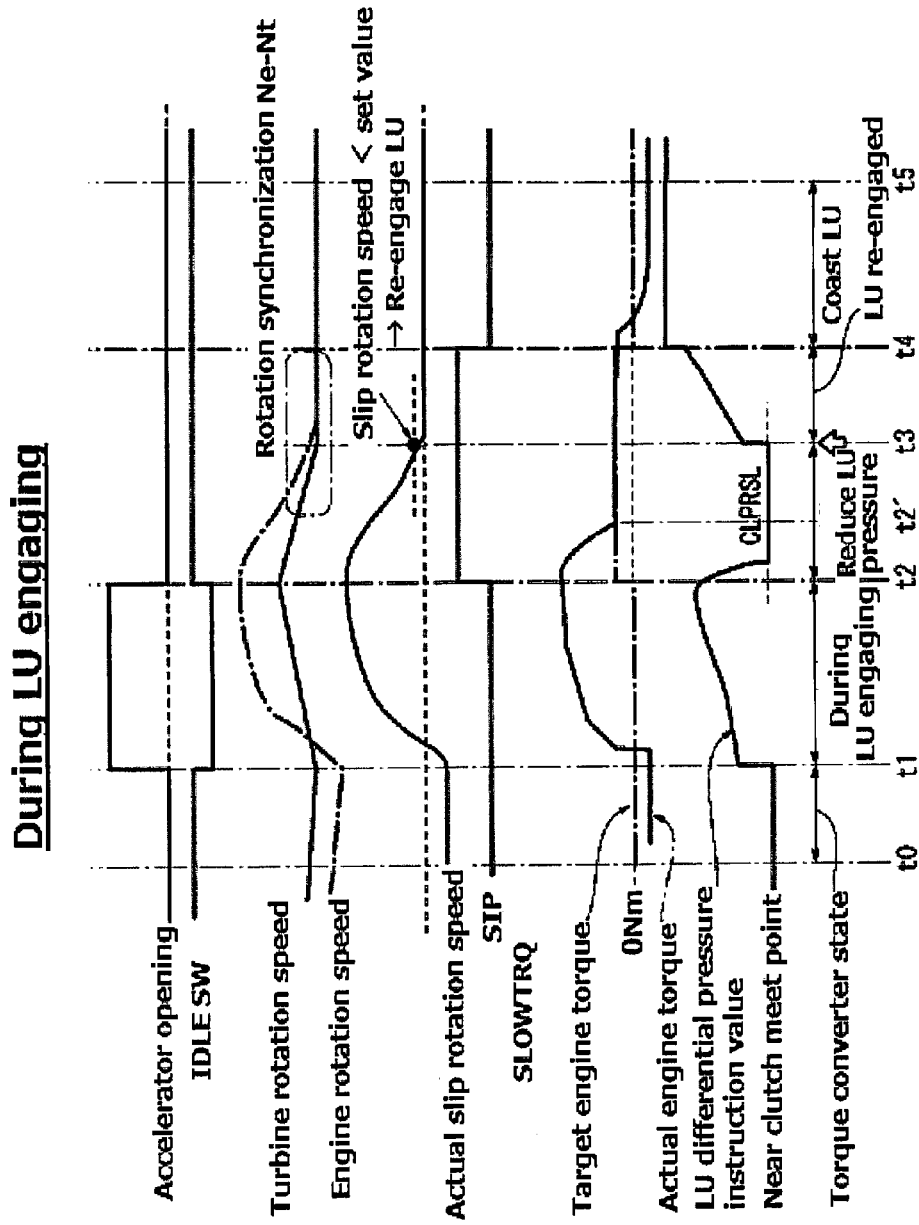
FIG. 5 is a time chart showing respective characteristics of an accelerator opening, an engine speed, a turbine rotation speed, a target slip rotation speed, an actual slip rotation speed, a target engine torque, an actual engine torque lock, and an lock-up command when the coast lock-up control is performed during lock-up engaging in the first embodiment.

Now, a description is given of a coast lock-up control operation from a lock-up engaging state with reference to the time chart shown in FIG. 5. Note that, in FIG. 5, time t1 indicates an accelerator depression operation time, time t2 accelerator foot release operation time, time t3 indicates a clutch re-engagement initiation time, time t4 indicates a clutch re-engagement completion time, and time t5 indicates a coast LU time, respectively. Further, a period between time t0 and time t1 indicates a torque converter state interval, a period between time t1 and time t2 indicates a LU engaging interval, a period between time t2 and time t3 indicates a LU hydraulic pressure reducing interval, a period between time t3 and time t4 indicates a LU re-engagement interval, and a period between time 4 and time t5 indicates a coast LU interval, respectively.

In other words, after a torque converter state interval due to an accelerator foot release has passed extending from time t0 to time t1, upon accelerator depression operation being started at time t1, during a LU engaging period between time t1 and time t2, a lock-up control is performed to engage the lock-up clutch 3. The lock-up engagement control is made so as to launch the LU differential pressure at a gentle gradient toward time t2 from time t1.

During the LU engaging process when the accelerator foot release operation is carried out at time t2 where a rotation difference exists between the engine speed and the turbine rotation speed, instead of performing the fuel cut-off and release of the lock-up clutch 3, the lock-up clutch 3 is re-engaged and the fuel cut-off operation is performed. In other words, during the LU hydraulic pressure reducing period in the time period between t2 and t3, a combination of the engine torque control and the LU hydraulic pressure reducing control is performed to allow the actual slip rotation difference of the lock-up clutch 3 to converge toward "0" rpm. In the engine torque control, the actual engine torque may be set to a low, constant value in order for the actual slip rotation speed to match the target slip rotation speed (=0 rom). By the LU hydraulic pressure reducing control, LU hydraulic pressure reduction is started at time t2, and during the interval between time t2 and time t3, the LU differential pressure instruction value will be fixed in the vicinity of the clutch meet point.

When a determination is made of the rotation synchronization state at a time t3 in which the slip rotation speed falls to or below the set value, the lock-up clutch 3 is re-engaged during a LU re-engagement interval extending between time t3 and time t4. In the clutch re-engagement control, as in the case of FIG. 4, the lock-up clutch 3 will be re-engaged quickly at a ramp gradient steeper than normal. Note that the period from time t2' to time t4 during which the actual engine torque decreases to the target engine torque represents the coast LU rotation synchronization control interval. Further, upon completion of the re-engagement of the lock-up clutch 3 at time t4, a fuel cut-off control is initiated with the target engine torque being set to zero, and the system enters a coast LU travel accompanied by the fuel cut-off operation.

Feature Operations of the Coast Lock-Up Control

As described above, in the first embodiment, when an accelerator foot release operation is carried out during a slip engagement mode in which a rotation speed difference in the lock-up clutch 3 is present in the accelerator depression state, the engine torque control is first implemented to synchronize the engine rotation speed and turbine rotation speed. Then, the lock-up clutch 3 is re-engaged in the rotation synchronization state. Subsequent to the re-engagement, fuel cut-off to the engine 1 is configured to be implemented.

In other words, the engine torque control is performed for synchronization of the engine speed with the turbine speed before the implementation of the fuel cut-off operation. Therefore, compared with the case of waiting for decrease in engine speed due to the accelerator foot release operation, the system proceeds to the rotational synchronization state in a short time from the accelerator foot release operation. Further, since the lock-up clutch 3 is re-engaged in the rotation synchronization state in which the engine rotation speed matches or substantially matches the turbine rotation speed, it is possible to suppress occurrence of rotation speed fluctuation and torque fluctuation (engagement shock) before and after re-engagement. As a result, when the accelerator foot release operation in the slip engagement mode is performed in a slip engagement mode during the slip LU state (FIGS. 2, 4), or, during the LU engaging state (FIGS. 3, 5), it is possible to perform LU re-engagement with engagement shock suppressed to thereby improve fuel economy.

In the first embodiment, upon the accelerator foot release operation, a lock-up differential pressure of the lock-up clutch 3 is configured to decrease to a lower limit region representing a clutch meet point where clutch capacity occurs (see step S15 in FIG. 2; step S25 in FIG. 3). In other words, if the lock-up clutch exhibiting a capacity excess would be released in response to the accelerator foot release operation at once completely, at the time of re-engagement, a time is required before completion of the re-engagement due to delay in hydraulic pressure response even if the LU differential pressure instruction value is to be increased. On the other hand, by setting the reduction in the lock-up differential pressure to the lower limit region representative of the clutch meet point, at the time of re-engagement, in response to increase in the LU differential pressure instruction value, the clutch capacity increases without undergoing the hydraulic pressure delay so that re-engagement may be completed quickly.

In the first embodiment, while the lock-up differential pressure is being decreased, the engine torque is configured to be controlled so that the slip rotation speed representing a difference between the engine rotation speed and the turbine rotation speed will reach zero (S16 in FIG. 2, S26 in FIG. 3). When re-engaging the lock-up clutch 3, engagement shock will be larger as the slip rotation speed representing the difference in rotation speed between the engine and the turbine is increased. Therefore, in the rotation synchronization control, it is desirable to allow the slip rotation speed to be as close to zero as possible. In this connection, by performing the engine torque control with a target of zero slip rotation speed, when re-engagement of the lock-up clutch 3 is performed, occurrence of engagement shock is suppressed reliably.

In the first embodiment, the lock-up clutch 3 is configured to be re-engaged after the slip rotation speed representing a rotation difference between the engine rotation speed and the turbine rotation speed is equal to or less than a set value (S17 to S18 in FIG. 2, S27→S28 in FIG. 3). Specifically, when re-engaging the lock-up clutch 3, engagement shock will increase as the re-engagement timing falls within a phase in which the slip rotation speed is greater. In contrast, by re-engaging the lock-up clutch 3 at the timing when the slip rotation speed is equal to or less than the set value, at the timing of re-engagement of the lock-up clutch 3, occurrence of engagement shock is suppressed reliably.

In the first embodiment, when the slip rotation speed is equal to or less than a set value, the rising gradient of LU differential pressure instruction value is configured to assume a larger lamp gradient than when engaging the lock-up clutch 3 in the released state (S18 in FIG. 2, S28 in FIG. 3). In other words, the fuel saving amount due to the fuel cut-off will be greater when the time required from the accelerator foot release operation time t2 to the clutch re-engagement completion time t3 is made shorter. Given this pre-requisite, by re-engaging the lock-up clutch 3 at a large lamp gradient, the clutch re-engagement may be completed quickly to thereby allow greater fuel savings associated with fuel cut-off operation. A description will be given of effects. In the lock-up clutch control device in the first embodiment, following effects can be obtained.

Now, a description will be given of effects. In the lock-up clutch control system in the first embodiment, following effects can be obtained.

(1) In a vehicle provided with a torque converter 4 having a lock-up clutch 3 between an engine 1 and a transmission (continuously variable transmission 6), a coast lock-up control unit (FIGS. 2, 3) is provided that is configured, when an accelerator foot release operation is performed in a slip engagement mode in which a rotation difference is present in the lock-up clutch 3 with an accelerator pedal being depressed, to bring the engine 1 in a fuel cut-off state. The coast lock-up control unit (FIGS. 2, 3) is further configured to perform an engine torque control to synchronize the engine rotation speed and the turbine rotation speed in response to the accelerator foot release operation, to re-engage the lock-up clutch 3 in the rotation synchronization state, and, after the re-engagement, to perform a fuel cut-off. Therefore, when the accelerator foot release operation is performed in the slip engagement mode, it is possible to improve the fuel efficiency by the lock-up re-engagement with a reduced engagement shock.

(2) The coast lock-up control unit (FIGS. 2, 3) is further configured to perform the engine torque control by decreasing the lock-up differential pressure of the lock-up clutch 3 to a lower limit region representing a clutch meet point where clutch capacity occurs (S15 in FIG. 2, S25 in FIG. 3). Therefore, in addition to the effect of (1) above, at the time of re-engagement of the lock-up clutch 3, it is possible to conclude the re-engagement quickly due to increase in clutch capacity without a hydraulic pressure delay with respect to increase in the lock-up differential pressure instruction value.

(3) The coast lock-up control unit (FIGS. 2, 3) is further configured, while decreasing the lock-up differential pressure, to control the engine torque so that the slip rotation speed representing a difference between the engine speed and the turbine speed will reach zero (S16 in FIG. 2, S26 in FIG. 3). Therefore, in addition to the effects of (2), upon re-engagement of the lock-up clutch 3, by performing the engine torque control for the target slip rotational speed reaching zero, it is possible to reliably suppress the occurrence of engagement shock.

(4) The coast lock-up control unit (FIGS. 2, 3) is further configured, once the slip rotation speed representing the rotation speed difference between the engine rotation speed and the turbine rotation speed is equal to or less than a set value, to re-engage the lock-up clutch 3 (S17→S18 in FIG. 2, S27→S28 in FIG. 3). Therefore, in addition to the effect of (3), upon re-engagement of the lock-up clutch 3, by performing the re-engagement at the timing when the slip rotation speed is equal to or less than the set value, the occurrence of engagement shock can be reliably suppressed.

(5) The coast lock-up control unit (FIG. 2, FIG. 3) is further configured, when the slip rotation speed is equal to or less than the set value, to re-engage the lock-up clutch with a rising gradient of the lock-up differential pressure at a lamp gradient larger than when engaging the lock-up clutch 3 in a released state. Therefore, in addition to the effect of (4), after reaching a synchronization rotation state, it is possible to complete re-engagement of the lock-up clutch 3 quickly. As a result, it is possible to increase the fuel efficiency allowance by fuel cut-off. While the lock-up clutch control device for a vehicle according to the present invention has been described with reference to the first embodiment, specific configuration is not limited to the first embodiment. Rather, according to each claim of the claims, without departing from the gist of the invention, design changes and additions are acceptable.

In the first embodiment, an example is shown in which the coast lock-up unit is configured to perform the engine torque control by decreasing the lock-up differential pressure of the lock-up clutch 3 to a lower limit region representing a clutch meet point where clutch capacity occurs. However, the coast lock-up control unit may be configured, upon the accelerator foot release operation, to perform the engine torque control while holding the lock-up differential pressure as it is. Alternatively, another example is conceivable in which, upon the accelerator foot release operation, the lock-up differential pressure may be reduced by a predetermined amount to perform the engine torque control.

In the first embodiment, an example is shown in which the coast lock-up unit is configured, while lowering the lock-up differential pressure, to control the engine torque so that the slip rotation speed representing a rotation speed difference between the engine speed and the turbine speed will reach zero. However, the coast lock-up control unit is not limited to the specific control method described in the first embodiment as long as the engine torque is controlled in order for the slip rotation speed to reach zero, while lowering the lock-up differential pressure.

In the first embodiment, an example is shown in which the lock-up clutch control device according to the present invention is applied to an engine vehicle equipped with a continuously variable automatic transmission. However as long as an engine installed vehicle as a drive source, the lock-up control system according to the present invention may be applied to a hybrid vehicle. Also, the transmission may be a step transmission subject to step stage speed changes. In short, the present invention is applicable to a vehicle equipped with a lock-up clutch incorporating torque converter disposed between an engine and a transmission.

The invention claimed is:

1. A vehicle lock-up clutch control device for a vehicle in which a torque converter having a lock-up clutch is provided between an engine and a transmission, the vehicle lock-up clutch control device comprising:
a controller programmed to execute a coast lock-up control to put the engine in a fuel cut-off state in response to an accelerator foot release operation being performed during a slip engagement mode in which a rotation difference is present in the lock-up clutch with an accelerator pedal being depressed, the coast lock-up control including
performing an engine torque control to synchronize an engine rotation speed and a turbine rotation speed to a rotational synchronization state in response to the accelerator foot release operation,
re-engaging the lock-up clutch in the rotation synchronization state, and
putting the engine in the fuel cut-off state after re-engaging the lock-up clutch.

2. The vehicle lock-up clutch control device according to claim 1, wherein
the controller is further programmed to perform the engine torque control by decreasing a lock-up differential pressure of the lock-up clutch to a lower limit region representing a clutch meet point where clutch capacity occurs.

3. The vehicle lock-up clutch control device according to claim 2, wherein
the controller is further programmed to perform the engine torque control so that a slip rotation speed representing a difference between the engine rotation speed and the turbine rotation speed will reach zero while decreasing the lock-up differential pressure.

4. The vehicle lock-up clutch control device according to claim 3, wherein
the controller is further programmed to re-engage the lock-up clutch once the slip rotation speed is equal to or less than a set value.

5. The vehicle lock-up clutch control device according to claim 4, wherein
when the slip rotation speed is equal to or less than the set value, the controller re-engages the lock-up clutch with a rising gradient of the lock-up differential pressure at a ramp gradient larger than when engaging the lock-up clutch from a released state.

* * * * *